United States Patent Office 3,179,560
Patented Apr. 20, 1965

3,179,560
METHOD OF EMPLOYING SULFAMOYLPHENYL ESTERS OF ORGANIC PHOSPHATES
Redginal Irving Hewitt, Spring Valley, N.Y., and Gerald Berkelhammer, Trenton, N.J., assignors to American Cyanamid Company, Stamford, Conn., a corporation of Maine
No Drawing. Filed July 25, 1962, Ser. No. 212,435
10 Claims. (Cl. 167—53)

This invention relates to methods and compositions for controlling parasites attacking warm-blooded animals and more particularly is concerned with novel compositions which have been found to possess systemic insecticidal activity in mammals.

Domestic animals are subject to attack by a number of different parasites, including fleas, flies, lice, ticks, screwworms and cattle grubs as well as the helminthic parasites such as lung worms, stomach worms and gastrointestinal worms.

The parasites during maturation and growth have a very deleterious effect upon the animal and its rate of growth. In the intestine the parasites erode the epithelial tissues bringing about hemmorrhage, anemia, weakness and tissue necrosis. Animals, if they do not succumb to gross parasitism are rendered economically unfit by weakness, lowered vitality, and poor growth and reproduction. It is estimated that the losses accruing to the cattle industry of the United States from gross parasitism amount to about fifty million dollars per year, with yearly losses due solely to mortality running as high as nine million dollars.

A particularly undesirable parasite in animals is the cattle grub. This grub is the larval form of the heel fly (*Hypoderma lineatum*), the bomb fly (*Hypoderma bovis*) or the bot fly (*Dermatobia hominis*). The latter fly is found mostly in the Central and South American countries. The heel and bomb flies appear in the United States in July and August and fasten their eggs near the base of the hair on their host. The bot fly is not seasonal in the Central and South American habitat and lays its eggs on an insect such as a mosquito or common fly which carries the eggs to the warm-blooded host. Following their attachment, the eggs of the various flies hatch in four or five days and the larvae bore through the skin of the host. The heel fly larvae migrate to the esophageal region or the abdominal viscera while the bomb fly larvae migrate through the spinal canal. During their life in the host, the larvae feed upon host tissue. After from about three to six months, depending upon the climatic conditions, the larvae locate in the skin and particularly the skin on the back of the host. Here, the larva opens a hole through the skin, usually in the choicest part of the hide, and grows rapidly for about six weeks. The larva thereafter leaves the animal through the hole in the skin, falls to the ground and shortly thereafter, depending upon the prevailing temperature, pupates for its transformation to the adult stage.

No completely satisfactory control for such cattle grubs is known. The organisms cause considerable damage to the carcass of beef animals. In infested areas, losses from beef trimmings and prime leather run as high as ten dollars a carcass. Thus the yearly loss to the cattle industries of the United States runs into the millions of dollars.

The present invention is based upon the discovery that a new class of sulfamoylphenyl esters of organic phosphates have been found to be very effective systemic insecticides which kill ectoparasites and internal parasites such as helminths in mammals including livestock of commercial importance. The subsequent killing of mosquitoes, lice, cattle grubs and related insects and other arthoropods such as ticks by oral or parenteral routes is a much more convenient method to rid the host of these damaging ectoparasites than by the former method of applying contact insecticides externally at frequent intervals.

As indicated earlier, the novel compositions of this invention are also useful anthelmintics in the treatment of cattle and other livestock naturally infected with economically important gastrointestinal helminths.

The sulfamoylphenyl organic phosphates of this invention may be represented by the following general formula:

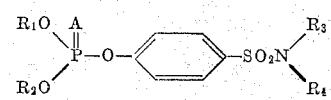

wherein $R_1$ and $R_2$ are lower alkyl radicals of from 1 to 4 carbon atoms, A is oxygen or sulfur, and $R_3$ and $R_4$ are hydrogen or lower alkyl radicals of from 1 to 6 carbon atoms.

It is an advantage of the present invention that the new compounds have been found to be assimilable by warm-blooded animals and to control parasites attacking the flesh, hide, viscera or vascular system of the animals. It is a further advantage that the compounds may be safely administered without serious toxic effects upon the animal. That is to say, the chemotherapeutic indices with the systemic insecticides of this invention varies widely indicating a very wide margin of safety in most cases. While the exact dose to be administered to the animal is dependent upon the parasite to be controlled and the particular organic phosphate employed as well as upon whether the administration is to be in a single dose or in multiple doses over a period of days, in general, it has been found that the systemic insecticides of this invention may be administered orally or parenterally to warm-blooded animals in amounts ranging from about 0.01 to about 100 milligrams per kilogram of body weight and preferably from about 0.01 to about 30 milligrams per kilogram of body weight.

An important advantage of the invention lies in the fact that the drug is metabolized in the body of the animal so that the flesh thereof is safe to eat by humans within a reasonably short period after the animal has been treated with the insecticide.

A still further advantage of the invention lies in the fact that one single dosage of the organic phosphates can kill all three stages of the warble fly which exist in the body of the animal. Thus one or two courses of treatments per year are all that are required for the control of this insect pest. One treatment may also be sufficient to rid the animal of lice and other arthropods which may live thereon. Although one dosage will kill such transient insects as mosquitoes which attack the animal within a few hours after treatment, it is obvious that repeated dosages would be required to control mosquitoes over a long period of time. This type of mosquito control may be desired in particular circumstances but is not recommended over long periods of time.

As indicated above, the systemic insecticides of the present invention may be administered orally or parenterally. When given orally, they may be in any convenient and customary oral form of medication, such as a capsule, tablet or as a drench. This insecticide may be incorporated in the animals' feed or drinking water. If desired, the insecticide may be introduced into the body of the animal by hypodermic or intramuscular injection. In special circumstances where the compounds are absorbed through the skin, dips or sprays may be used. The manner of administration of the insecticide is not particularly important so long as the prescribed amounts of the insecticide are introduced into the body of the animal where it may be distributed throughout the body by the action of the circulatory system.

Certain of the sulfamoylphenyl organic phosphates of this invention may be prepared by reacting an appropriate phosphorochloridothioate, e.g. O,O-dimethylphosphorochloridothioate with a suitable sulfonamide, e.g. p-hydroxybenzenesulfonamide, under alkaline conditions in the presence of a suitable aqueous or inert polar solvent, e.g., water, acetone, methyl ethyl ketone, toluene, etc., at temperatures ranging from about 0° C. to about 100° C.

The invention will be described in greater detail in conjunction with the following specific examples.

EXAMPLE 1.—O,O-DIETHYL O-p-SULFAMOYLPHENYL PHOSPOROTHIOATE

O,O-diethyl phosphorochloridothioate (18.9 g., 0.1 mole) is added all at once to a stirred mixture of p-hydroxybenzenesulfonamide (17.3 g., 0.1 mole) and sodium carbonate (10.6 g., 0.1 mole) in 200 milliliters of methyl ethyl ketone. The reaction mixture is heated under reflux with stirring for three hours, then stirred at room temperature overnight. Filtration, followed by removal of the solvent under reduced pressure leaves a red oil (16.4 g., 50.4%), $n_D^{25}$ 1.5346. Chromatographic purification using acid-washed activated alumina gives the analytically pure material.

EXAMPLE 2.—O,O-DIMETHYL O-p-SULFAMOYLPHENYL PHOSPHOROTHIOATE

To a mixture of p-hydroxybenzenesulfonamide (17.3 g., 0.1 mole) and sodium carbonate (10.6 g., 0.1 mole) in 100 milliliters of methyl isobutyl ketone is added O,O-dimethyl phosphorochloridiothioate (16.0 g., 0.1 mole) in one portion, with stirring. The reaction mixture is stirred at 60–65° for 6.5 hours and allowed to stand at room temperature overnight. The solids are removed by filtration and the filtrate washed with three 25 milliliter portions of 10% sodium carbonate solution and three 25 milliliter portions of saturated sodium chloride solution. Drying over magnesium sulfate, followed by removal of the solvent under reduced pressure leaves a reddish orange oil (12.1 g., 41%). Chromatography on acid-washed alumina gives 9.9 g. of a white solid, the purest fraction having melting point 42.5–43° C.

When this material is recrystallized from toluene, a crystalline modification melting at 70–71° C. is obtained having identical infrared spectrum and elementary analysis as the original compound.

EXAMPLE 3.—O,O-DIMETHYL O-p-SULFAMOYLPHENYL PHOSPHOROTHIOATE

A mixture of p-hydroxybenzenesulfonamide (69.3 g., 0.4 mole), O,O-dimethyl phosphorochloridothioate (64.2 g., 0.4 mole), sodium hydroxide (32 g., 0.8 mole) and 700 milliliters of water are stirred for five and one-half hours at room temperature and then allowed to stand overnight. The reaction mixture is extracted with 300 milliliters of ether, the extracts dried over magnesium sulfate, and the solvent removed under reduced pressure. The residue is a light brown oil (47.8 g., 40%) which crystallizes on seeding. Two recrystallizations from toluene give tan crystals, melting point 69–70° C.

EXAMPLE 4.—DIETHYL p-SULFAMOYLPHENYL PHOSPHATE

A mixture of diethyl phosphorochloridate (17.2 g., 0.1 mole), p-hydroxybenzenesulfonamide (17.3 g., 0.1 mole), and sodium carbonate (10.6 g., 0.1 mole) in 100 milliliters of methyl ethyl ketone is heated under reflux for three hours, allowed to stand overnight at room temperature, and finally refluxed for five hours more. The solids are removed by filtration and the solvent evaporated from the filtrate under diminished pressure. The residual red oil is dissolved in 100 milliliters of methyl isobutyl ketone and the resultant solution washed three times with 25 milliliter portions of 10% sodium carbonate solution, followed by three washings with 25 milliliter portions of saturated aqueous sodium chloride. Drying over magnesium sulfate and removal of the solvent under vacuum leaves a yellow-white solid (17.1 g., 56%) melting point 73.5–77.5° C. Two recrystallizations from water give the analytical sample melting point 80–81° C.

EXAMPLE 5.—DIMETHYL p-SULFAMOYLPHENYL PHOSPHATE

Dimethyl phosphorochloridate (28.9 g., 0.2 mole), p-hydroxybenzenesulfonamide (34.6 g., 0.2 mole) and sodium carbonate (21.2 g., 0.2 mole) are heated under reflux in 200 milliliters of methyl ethyl ketone for one hour and then allowed to stand overnight at room temperature. The solids are removed by filtration and the solvent evaporated under reduced pressure. The residual brown oil is taken up in 150 milliliters of methyl isobutyl ketone and washed with three 25 milliliter portions of brine. Drying over magnesium sulfate followed by removing the solvent under diminished pressure leaves a brown oil (26.2 g., 46.5%). Chromatography on acid-washed alumina gives a solid, which when recrystallized from benzene-ethyl acetate melts at 85.5–87° C.

EXAMPLE 6.—O,O-DIMETHYL O-p-(ISOPROPYLSULFAMOYL) PHENYL PHOSPHOROTHIOATE

To a mixture of N-isopropyl-1-phenol-4-sulfonamide (5.4 g., 0.025 mole) and sodium hydroxide (1.0 g., 0.025 mole) in 75 milliliters of water are added separately and simultaneously O,O - dimethylphosphorochloridothioate (4.0 g., 0.025 mole) and a solution of sodium hydroxide (1.0 g., 0.025 mole) in 50 milliliters of water. The mixture is stirred at room temperature for three and one-half hours and allowed to stand overnight. The reaction mixture is extracted with 125 milliliters of ether, the ethereal extracts dried over magnesium sulfate and the ether removed under reduced pressure yielding an oil (2.1 g., 24.5%). The oil is chromatographed on acid alumina adsorbent, yielding a colorless oil (1.8 g., 21%).

EXAMPLE 7.—O,O-DIETHYL O-p-(ISOPROPYLSULFAMOYL) PHENYL PHOSPHOROTHIOATE

The procedure of Example 6 is followed except that O,O-diethyl phosphorochloridothioate (4.7 g., 0.025 mole) is substituted for the corresponding dimethyl compound. After addition, the mixture is stirred at room temperature for two hours and fifty minutes and allowed to stand overnight. The reaction mixture is extracted with 210 milliliters of ether, the ethereal extracts dried over magnesium sulfate and the ether evaporated under reduced pressure, yielding a pale yellow oil (3.0 g., 33%). Chromatography of the oil on acid alumina adsorbent yields the product as an oil (1.3 g., 14%).

EXAMPLE 8.—DIMETHYL p-(ISOPROPYLSULFAMOYL) PHENYL PHOSPHATE

Dimethyl phosphorochloridate (3.8 g., 0.025 mole), N-isopropyl-1-phenol-4-sulfonamide (5.4 g., 0.025 mole) and sodium carbonate (2.6 g., 0.025 mole) are refluxed in 50 milliliters of methyl ethyl ketone for five and three-quarter hours and allowed to stand overnight at room temperature. The solids are filtered from the mixture and the filtrate evaporated under reduced pressure, yielding a viscous brown oil (7.0 g., 86.5%). The oil is taken up in 75 milliliters of methyl isobutyl ketone, washed with 60 milliliters of 10% sodium bicarbonate solution and 60 milliliters of saturated sodium chloride solution. The ketonic solution is dried over magnesium sulfate and evaporated under reduced pressure, yielding a light brown oil (4.6 g., 57%). The oil is chromatographed on silica gel adsorbent, yielding a pale brown oil (4.1 g., 51%).

EXAMPLE 9.—O,O-DIMETHYL O-p-(DIMETHYLSULFAMOYL) PHENYL PHOSPHOROTHIOATE

To a mixture of N,N-dimethyl-1-phenol-4-sulfonamide (5.0 g., 0.025 mole) and sodium hydroxide (1.0 g., 0.025 mole) in 50 milliliters of water are added separately and simultaneously O,O - dimethylphosphorochloridothioate (4.0 g., 0.025 mole) and a solution of sodium hydroxide (1.0 g., 0.025 mole) in 25 milliliters of water. The mixture is stirred at room temperature for three hours, extracted with ether, the ethereal extracts dried over magnesium sulfate and the ether removed under reduced pressure, yielding 3.8 g., (47%) of solid material. Recrystallization from toluenehexane yields the pure product melting point 52.5–53.5° C.

EXAMPLE 10.—O,O-DIMETHYL O-p-(METHYLSULFAMOYL) PHENYL PHOSPHOROTHIOATE

To a solution of N-methyl-1-phenol-4-sulfonamide (21.3 g., 0.11 mole) in 230 milliliters of 0.5 N sodium hydroxide is added O,O-dimethylphosphorochloridothioate (18.3 g., 0.11 mole) and the solution stirred at 40°. The mixture pH is maintained at 10–11 until reaction is complete. The reaction mixture is extracted with ether, the ethereal solution dried over magnesium sulfate and the solvent removed under reduced pressure to yield 23.2 g. (66%) of an oil which crystallizes slowly. Recrystallization from toluene-hexane yields the pure product melting point 36–38° C., 61% of theory.

EXAMPLE 11.—O,O-DIMETHYL O-p-(ETHYLSULFAMOYL) PHENYL PHOSPHOROTHIOATE

The procedure employed in the preparation of O,O-dimethyl O-p-(isopropylsulfamoyl)phenyl phosphorothioate (Example 6) is followed, using N-ethyl-1-phenol-4-sulfonamide. Chromatographic purification of the crude oil obtained yields the pure product as as colorless oil, $n_D^{25}=1.5392$, 37% of theory.

EXAMPLE 12

A calf naturally infected with larvae of *Hypoderma lineatum* was treated with a single oral dose of O,O-diethyl-p-sulfamoylphenyl phosphate in a single oral dose of 1 milligram per kilogram of body weight. The dose was administered at a time when second instar larvae were just beginning to penetrate the hide. A total of 21 grubs was found six weeks later. Of these, three third instar larvae were alive and 18 second instar larvae were all dead and practically disintegrated, which shows the systemic activity of this compound against the second instar stage of this parasite.

EXAMPLE 13

The effectiveness of the compounds of the present invention as systemic insecticides in warm-blooded animals was demonstrated in a number of different animals at different dosage levels using mosquitoes as the test arthropod. *Aedes aegypti* mosquitoes were raised in an insectary by conventional methods and the females were selected. They were placed in appropriate containers which were held against the shaved skin of mice, dogs or cattle in such a manner that the mosquitoes were free to feed upon the mouse. The mice were fed a variety of compounds as set forth below at various dosage levels. Observations were made on the mosquitoes for 72 hours after being allowed to feed upon the treated mice. The dosage of the insecticide in milligrams per kilogram of body weight in the mouse necessary to kill half of the mosquitoes feeding upon the mice were determined and is set forth in the table below under the column $ED_{50}$. Also the dosage of the insecticide in the mice which resulted in death of half of the mice were observed and is indicated in the table below.

*Table 1*

$$\underset{R_2O}{\overset{R_1O}{\diagdown}}\overset{\overset{A}{\|}}{P}-O-\underset{}{\bigcirc}-SO_2N\underset{R_4}{\overset{R_3}{\diagup}}$$

| Compound $R_1$, $R_2$ | $R_3$, $R_4$ | Approximate Oral $ED_{50}$ Mouse-*Aedes*, mg./kg. | Approximate Oral $LD_{50}$ Mouse, mg./kg. | C.I. $LD_{50}/ED_{50}$ |
|---|---|---|---|---|
| p-sulfamoyl: | | | | |
| $(CH_3O)_2$—P(O)O— | H,H | 0.02 | 15 | 750 |
| $(C_2H_5O)_2$—P(O)O— | H,H | 0.03 | 25 | 830 |
| $(CH_3O)_2$—P(O)O— | H,$C_3H_7i$ | 0.3 | 50 | 170 |
| $(CH_3O)_2$—P(S)O— | H,H | 0.03 | 40 | 1,300 |
| $(CH_3O)_2$—P(S)O— | H,$CH_3$ | 0.1 | 15 | 150 |
| $(CH_3O)_2$—P(S)O— | $CH_3$,$CH_3$ | 0.4 | 30 | 75 |
| $(CH_3O)_2$—P(S)O— | H,$C_2H_5$ | 0.2 | 65 | 325 |
| $(CH_3O)_2$—P(S)O— | H,$C_3H_7i$ | 0.1 | 75 | 750 |
| $(C_2H_5O)_2$—P(S)O— | H,H | 0.25 | 15 | 60 |
| $(C_2H_5O)_2$—P(S)O— | H,$C_3H_7i$ | 5 | 90 | 18 |

EXAMPLE 14

The effectiveness of O,O-diethyl-p-sulfamoylphenyl phosphate as a systemic insecticide in dogs was further evaluated using as test arthropod mosquitoes (*Aedes aegypti*). The compound was found to be active systemically in single oral doses of 0.25 to 1.0 mg./kg. and a single subcutaneous dose of 0.05 to 0.1 mg./kg. The results of these series of tests are shown in the following table.

*Table 2*

| Single dose, mg./kg. | No. Aedes Aegypti killed in 72 hours/No. feeding on dogs, hours after treatment | | |
|---|---|---|---|
| | 1 | 4 | 24 |
| 0.1 Oral | 2/29 | 3/31 | 2/29 |
| 0.1 Oral | 2/32 | 19/33 | 3/33 |
| Totals | 4/61 | 22/64 | 5/62 |
| 0.25 Oral | 5/27 | 33/33 | 1/29 |
| 0.25 Oral | 7/31 | 29/32 | 2/24 |
| 0.25 Oral | 17/17 | 1/28 | 5/58 |
| Totals | 29/75 | 63/93 | 8/91 |
| 0.5 Oral | 0/20 | 14/21 | 0/12 |
| 0.5 Oral | 17/17 | 27/27 | 15/24 |
| 0.5 Oral | 25/30 | 12/16 | 22/30 |
| 0.5 Oral | 13/27 | 18/31 | 7/28 |
| Totals | 55/94 | 71/95 | 44/94 |
| 1.0 Oral | 4/24 | 10/14 | 11/14 |
| 1.0 Oral | 3/36 | 30/35 | 17/20 |
| Totals | 7/60 | 40/49 | 28/34 |
| 0.05 Subcut | 18/23 | 18/31 | 7/23 |
| 0.1 Subcut | 18/23 | 24/38 | 19/34 |

EXAMPLE 15

The effectiveness of certain other compounds of this invention as systemic insecticides was further evaluated in mammalian hosts. Tests were conducted using the test arthropod *Aedes aegypti* fed on treated calves as in the preceding example. The results of these tests are shown in the following table.

*Table 3*

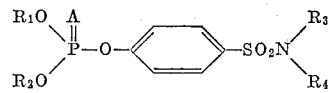

| Compound $R_1, R_2$ | $R_3, R_4$ | Single oral dose, mg./kg. | No. Aedes killed in 72 hrs./No. feeding on calves, hrs. after treatment | |
|---|---|---|---|---|
| | | | 1 | 4 |
| $(C_2H_5O)_2-P(O)O$ | H, H | 1 | 4/21 | 23/25 |
| $(C_2H_5O)_2-P(O)O$ | H, H | 2 | 10/18 | 26/26 |
| $(C_2H_5O)_2-P(O)O$ | H, H | 5 | 16/17 | |
| $(CH_3O)_2-P(S)O$ | H, H | 1 | 18/23 | 21/34 |
| $(CH_3O)_2-P(S)O$ | H, H | 5 | 15/16 | 25/29 |
| $(C_2H_5O)_2-P(S)O$ | H, H | 2 | 16/26 | 21/25 |
| $(C_2H_5O)_2-P(S)O$ | H, H | 2 | 4/14 | 23/29 |
| $(CH_3O)_2-P(O)O$ | H, H | 5 | 1/29 | 31/32 |

EXAMPLE 16.—ACTIVITY AGAINST CATTLE GRUBS

The cattle listed in the table below were selected from an area in North Dakota, where infection with cattle

*Table 4*

| Compound $R_1, R_2$ | $R_3, R_4$ | No. of cattle | Route of treatment | Mg./kg. or percent spray | Percent control of grubs 4 months after treatment |
|---|---|---|---|---|---|
| $(CH_3O)_2-P(O)O$ | H, H | 5 | IM | 2.5 | 68 |
| $(C_2H_5O)_2-P(O)O$ | H, H | 5 | IM | 0.5 | 39 |
| $(C_2H_5O)_2-P(O)O$ | H, H | 5 | Spray | 0.2% | 60 |
| $(CH_3O)_2-P(S)O$ | H, H | 5 | IM | 15 | 85 |
| $(CH_3O)_2-P(S)O$ | H, $CH_3$ | 2 | IM | 15 | 100 |
| $(CH_3O)_2-P(S)O$ | H, $CH_3$ | 7 | IM | 7.5 | 93 |
| $(CH_3O)_2-P(S)O$ | $CH_3, CH_3$ | 5 | IM | 15 | 100 |
| $(CH_3O)_2-P(S)O$ | H, $C_3H_7i$ | 5 | IM | 15 | 38 |
| $(C_2H_5O)_2-P(S)O$ | H, H | 5 | Oral | 1.0 | 63 |
| $(C_2H_5O)_2-P(S)O$ | H, H | 5 | Spray | 0.2% | 46 | grubs was known to occur. Twenty were not treated and served as controls for the remainder of the herd. The rest were segregated in groups of from 2–7 as indicated in the table and were treated with the sulfamoylphenyl organic phosphates at the parenteral or oral doses indicated, or with sprays as indicated. The compounds were dissolved or suspended in suitable vehicles and the quantities of the resulting suspensions or dilutions were graduated to insure the proper dosage levels in mg./kg. Sprays were applied in volumes of 4 liters.

At monthly intervals after treatment, the hides of the animals, principally in the region of the back, were examined for the presence of grubs. The degree of control of appearance of the grubs, as compared to the 20 untreated animals, indicates the efficacy of the particular dose level and by the route of administration listed.

The twenty control cattle had an average of 18 grubs per animal at the 4-month observation period, when the "peak" period was attained.

EXAMPLE 17.—ACTIVITY AGAINST GASTROINTESTINAL NEMATODES IN CATTLE

The anthelmintic effectiveness of O,O-dimethyl-p-(dimethylsulfamoyl)-phenyl phosphorothioate was evaluated in cattle. The evaluation was made by two control tests (tests A and B) in cattle naturally infected with economically important gastrointestinal helminths.

The efficacy was determined by two standard helminthological procedures (1) A comparison of the difference in the number of eggs per gram of feces from treated and untreated control animals before treatment and once weekly for three or four weeks, and (2) A comparison of the number of worms recovered from treated and untreated animals.

Table 5 summarizes the egg reductions induced by the various dosage units of this compound. These sustained egg reductions of all the various treatment groups over the three or four week post-treatment interval when compared to the increased egg counts of the untreated controls demonstrate the anthelmintic effectiveness of all treatments.

Table 5.—*The anthelmintic effect of O,O-dimethyl O-p-(dimethylsulfamoyl)-phenyl phosphorothioate in cattle, based on egg reductions*

TEST A[1]

| Dose, mg./kg. | Route of treatment | No. of steers | Average percent trichostrongylid egg reduction from initial value* | | | |
|---|---|---|---|---|---|---|
| | | | Week after treatment | | | |
| | | | 1 | 2 | 3 | 4 |
| 50 | Oral drench | 5 | 94 | 87 | 90 | 91 |
| 50 (for 3 days) | Oral in feed | 5 | 96 | 91 | 90 | 96 |
| 50 | Intramuscular | 5 | 92 | 81 | 61 | 86 |
| 75 | Oral drench | 5 | 87 | 62 | 79 | 94 |
| 100 | Oral capsule | 5 | 90 | 94 | 90 | 94 |
| 100 | Dermal | 5 | 41 | 34 | 38 | 20 |
| 0 | Untreated control | 15 | +82 | +187 | +113 | +78 |

TEST B[2]

| 25 | Oral capsule | 4 | 64 | 57 | 52 | |
| 50 | do | 4 | 93 | 96 | 97 | |
| 50 | Oral in feed | 4 | 88 | 89 | 94 | |
| 0 | Untreated control | 4 | 15 | +23 | +22 | |

*Microscopic examination indicated that the majority of eggs remaining in the feces were those of *Oesophagostomum* spp.
[1] Ran 4 weeks.  [2] Ran 3 weeks.  +=Increased.

The necropsy results from some animals in test A confirm the high degree of anthelmintic activity against gastrointestinal nematodes in cattle (Table 6). These data also emphasize the reliability of sustained reduction of eggs in evaluating effectiveness in cattle.

*formis* were obtained by comparing worms eliminated in the feces to those retained at necropsy. Data are summarized in Table 7.

Table 6.—*Necropsy results of cattle test A*

| Dose, mg./kg. | Route of treatment | No. steers examined | Necropsy results | | | | |
|---|---|---|---|---|---|---|---|
| | | | *Ostertagia* | *T. axei* | *Haemonchus* | *Cooperia* | *Oesophagostomum* |
| | | | Average percent reduction of worms compared with untreated control | | | | |
| 50 | Oral drench | 5 | 99 | 86 | 100 | 99 | [b] 10 |
| 50 | Intramuscular | 5 | 88 | 5 | 100 | 99 | [b] 44 |
| 75 | Oral drench | 4 | 100 | 67 | 100 | ([a]) | 66 |
| 100 | Oral capsule | 2 | 100 | 100 | 100 | 100 | [c] 98 |
| | | | Average number of worms | | | | |
| 0 | Untreated control | 6 | 2,428 | 898 | 128 | 4,822 | [d] 101 |

[a] Not determined.
[b] 4 steers examined for *Oesophagostomum*.
[c] 1 steer examined for *Oesophagostomum*.
[d] 3 steers examined for *Oesophagostomum*.

EXAMPLE 18.—ACTIVITY AGAINST GASTROINTESTINAL NEMATODES IN SHEEP

O,O-dimethyl O-p-(dimethylsulfamoyl)-phenyl phosphorothioate was found to possess excellent anthelmintic efficacy against infections of the gastrointestinal nematodes of sheep. Results were based for the most part on the comparison of the difference in the numbers of worms at necropsy four to seven days after treatment, between untreated and treated animals of similar infections prior to treatment. Some data with *Trichostrongylous colubri-*

Table 7

| | Average percent efficacy (number of infections treated) oral dose mg./kg. | | |
|---|---|---|---|
| | 60 | 80 | 100–120 |
| *Haemonchus contortus* | 98 (3) | 95 (8) | 99 (7) |
| *Ostertagia* spp | 88 (4) | 96 (8) | 96 (9) |
| *Trichostrongylus axei* | 94 (3) | 98 (5) | 98 (4) |
| *T. colubriformis* | 95 (9) | 98 (8) | 94 (9) |
| *Cooperia* spp | 100 (3) | 99 (8) | 99 (9) |
| *Nematodirus* | 48 (2) | 44 (5) | 41 (9) |
| Total number of sheep on dose | 12 | 8 | 9 |

Another compound O,O-dimethyl O-p-(dimethylsulfamoyl) phenyl phosphate (described in United States Patent No. 3,005,002) removed 50% of the *Trichostrongylus colubriformis* from a sheep treated with an oral drench equivalent to 30 mg./kg., body weight.

EXAMPLE 19

Several other members of this sulfamoylphenyl series were found to be effective against the sheep nematode, *Trichostrongylus colubriformis* using control test procedures.

Table 8

| $R^1$ | A | $R^3$ | $R^4$ | Dose | Percent worm removal |
|---|---|---|---|---|---|
| A | $(C_2H_5O)_2$ | S | $CH_3$ | $CH_3$ | 25 mg./kg | >90 |
| B | $(C_2H_5O)_2$ | O | $CH_3$ | $CH_3$ | .005 ml./kg | >80 |
| C | $(CH_3O)_2$ | S | H | $CH_3$ | 60 mg./kg | >90 |

Compound A above is prepared by following the method of Example 7 and substituting N,N-dimethyl-1-phenol-4-sulfonamide for N-isopropyl-1-phenol-4-sulfonamide. Compound B above is prepared by following the method of Example 4 and substituting N,N-dimethyl-1-phenol-4-sulfonamide for p-hydroxybenzenesulfonamide.

EXAMPLE 20.—ACTIVITY AGAINST THE HELMINTHS OF DOGS

The anthelmintic effectiveness of O,O-dimethyl-p-(dimethylsulfamoyl)-phenyl phosphorothioate was tested in dogs. One hundred percent of the hookworms and ascarids were removed from a dog receiving 25 mg. of the above named compound per kg. of body weight in its feed per day for three consecutive days. All of the ascarids were removed from two other dogs after treatment with single subcutaneous doses of 50 mg./kg.

EXAMPLE 21.—ACTIVITY AGAINST CATTLE GRUBS

The procedures used were similar to those of Example 16. The compound O,O-dimethyl O-p-(dimethylsulfamoyl) phenyl phosphorothioate was highly effective when given as a single oral drench, in the feed of the cattle during a one-day or during a five-day period, or as a single dermal "pour-on" application (Table 9). In the latter method, the total quantities of compound shown in the table in about four fluid ounces of two different formulations were poured on the hide of each animal to cover the region of the spine. In nine other trials with 109 cattle, a dose of 15 mg./kg. intramuscularly has given an average of 97% control of grubs.

Table 9.—Percent Control[a] of cattle grubs by various routes of administration

| Total dose, mg./kg.[b] | Oral drench | In feed | | Dermal "Pour-On" | |
|---|---|---|---|---|---|
| | | 1 day | 5 days | Oil | Other |
| 75 (15) | | 100 | 99 | 100 | 99 |
| 50 (10) | 94 | 99 | 100 | 100 | 94 |
| 25 (5) | 99 | 93 | 96 | 99 | 95 |

[a] 5 Northern cattle per group. 15 Controls average 62 grubs.
[b] ( )=grams per head for pour-on treatments.

This application is a continuation-in-part of our copending application Serial No. 32,144, filed May 27, 1960, now abandoned, which application, in turn, is a continuation-in-part of our application Serial No. 817,082, filed June 1, 1959, now abandoned.

We claim:

1. A method for controlling insects, ticks and helminths attacking warm-blooded animals which comprises administering to the animal a chemotherapeutic dosage of a compound of the formula:

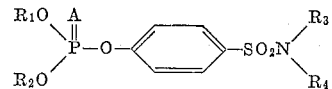

wherein $R_1$ and $R_2$ are lower alkyl of from 1 to 4 carbon atoms, A is a member of the group consisting of oxygen and sulfur atoms, and $R_3$ and $R_4$ are members of the group consisting of hydrogen and lower alkyl.

2. A method according to claim 1 in which the compound is O,O-diethyl O-p-sulfamoylphenyl phosphorothioate.

3. A method according to claim 1 in which the compound is O,O-dimethyl O-p-sulfamoylphenyl phosphorothioate.

4. A method according to claim 1 in which the compound is diethyl p-sulfamoylphenyl phosphate.

5. A method according to claim 1 in which the compound is dimethyl p-sulfamoylphenyl phosphate.

6. A method according to claim 1 in which the compound is O,O-dimethyl O-p-(isopropylsulfamoyl) phenyl phosphorothioate.

7. A method according to claim 1 in which the compound is O,O-diethyl O-p-(isopropylsulfamoyl) phenyl phosphorothioate.

8. A method according to claim 1 in which the compound is O,O-dimethyl O-p-(isopropylsulfamoyl) phenyl phosphate.

9. A method according to claim 1 in which the compound is O,O-dimethyl O-p-(dimethylsulfamoyl) phenyl phosphorothioate.

10. A method according to claim 1 in which the chemotherapeutic dosage administered to the animal is from about 0.01 to 100 milligrams per kilogram of body weight of said animal.

References Cited in the file of this patent

UNITED STATES PATENTS 3,005,004    Berkelhammer _____ Oct. 17, 1961

OTHER REFERENCES

McGregor: J. Econ. Ent., vol. 47, No. 3, June 1954, pages 465–467.